US011061560B2

(12) United States Patent
Ono

(10) Patent No.: US 11,061,560 B2
(45) Date of Patent: Jul. 13, 2021

(54) NON-VOLATILE RECORDING MEDIUM, INFORMATION PROCESSING METHOD, AND ELECTRONIC APPARATUS

(71) Applicant: CASIO COMPUTER CO., LTD., Tokyo (JP)

(72) Inventor: Manato Ono, Wako (JP)

(73) Assignee: CASIO COMPUTER CO., LTD., Tokyo (JP)

(*) Notice: Subject to any disclaimer, the term of this patent is extended or adjusted under 35 U.S.C. 154(b) by 25 days.

(21) Appl. No.: 16/119,540

(22) Filed: Aug. 31, 2018

(65) Prior Publication Data

US 2019/0087087 A1    Mar. 21, 2019

(30) Foreign Application Priority Data

Sep. 19, 2017    (JP) .............................. JP2017-179458

(51) Int. Cl.
*G06F 3/0354*    (2013.01)
*G06F 3/0488*    (2013.01)
(Continued)

(52) U.S. Cl.
CPC ........ *G06F 3/04886* (2013.01); *G06F 3/0485* (2013.01); *G06F 3/0679* (2013.01); *G06Q 50/00* (2013.01)

(58) Field of Classification Search
CPC ... G06F 3/0481; G06F 3/0485; G06F 16/9577
See application file for complete search history.

(56) References Cited

U.S. PATENT DOCUMENTS 5,943,051 A * 8/1999 Onda ................... G06F 3/0334
715/786
6,970,145 B1 * 11/2005 Aoki ...................... G06F 3/1431
345/1.2
(Continued)

FOREIGN PATENT DOCUMENTS

JP    2010108163 A    5/2010
JP    2014059421 A    4/2014

OTHER PUBLICATIONS

Usman, "Word2010: Synchronous Scrolling", Apr. 3, 2010 (Year: 2010).*

(Continued)

*Primary Examiner* — Jordany Nunez
(74) *Attorney, Agent, or Firm* — Holtz, Holtz & Volek PC

(57) ABSTRACT

A non-volatile recording medium has recorded thereon a program for causing a computer of an information processing apparatus to, when displaying a virtual electronic apparatus on a first display, display a first display area and a second display area on the first display, the first display area and the second display area each respectively capable of displaying at least part of contents stored as a display target in a virtual memory of the virtual electronic apparatus, the first display area being displayed on the first display as a virtual display of the virtual electronic apparatus, the second display area being capable of displaying, within one screen in the second display area, more contents than a maximum amount displayable within one screen in the first display area from among the stored contents of the display target.

12 Claims, 14 Drawing Sheets

(51) Int. Cl.
*G06F 3/0485* (2013.01)
*G06F 3/06* (2006.01)
*G06Q 50/00* (2012.01)

(56) References Cited

U.S. PATENT DOCUMENTS

| | | | |
|---|---|---|---|
| 6,993,575 B2 * | 1/2006 | Abkowitz | G06F 16/9577 709/220 |
| 7,343,559 B1 * | 3/2008 | Fujita | G06F 16/58 715/733 |
| 10,460,615 B2 * | 10/2019 | Weems | G09B 5/02 |
| 2005/0210445 A1 * | 9/2005 | Gough | G06F 9/453 717/111 |
| 2008/0120538 A1 * | 5/2008 | Kurz | G06F 16/9577 715/255 |
| 2020/0356254 A1 * | 11/2020 | Missig | G06F 3/04886 |

OTHER PUBLICATIONS

Gma, "Window Basic—Minimize—Maximize/Restore—Close", May 30, 2012 (Year: 2012).*

Theta30; "Office Word. How to open the same document in separate windows?"; Dec. 8, 2013 (Year: 2013).*

Scientific Calculator_Graphing Calculator_Software_Products_CASIO.

TI-Nspire™ CX CAS Handheld.

* cited by examiner

FIG. 12

| CALCULATOR ID | SAVED DATA NAME | DATE |
|---|---|---|
| A32B98XYZ | xxx.bin | 20YY/MM/DD h1:m1:s1 |
| B32956XYZ | yyy.bin | 20YY/MM/DD h2:m2:s2 |
| 2X3S9UXYZ | zzz.bin | 20YY/MM/DD h3:m3:s3 |
| ... | ... | ... |

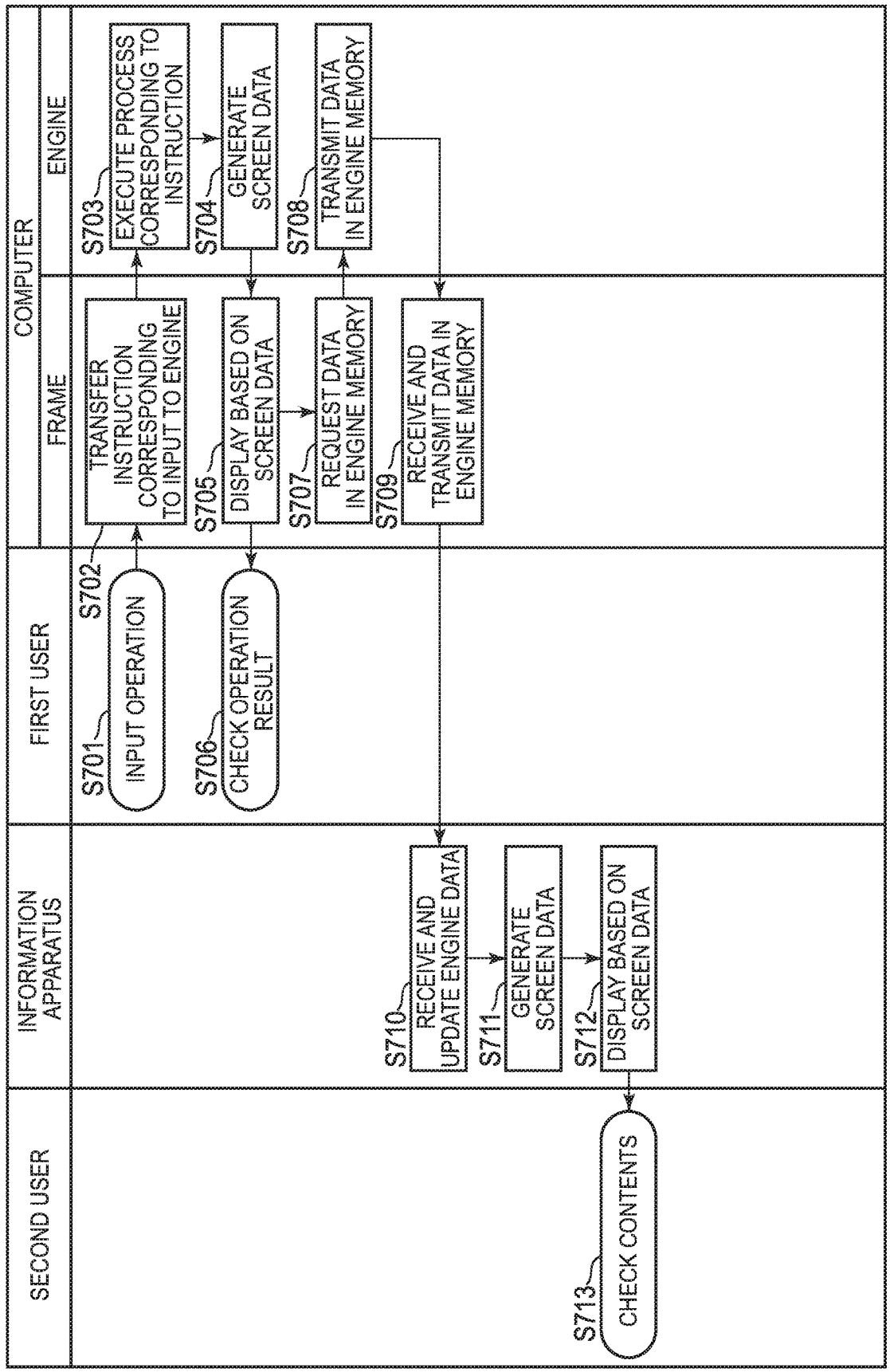

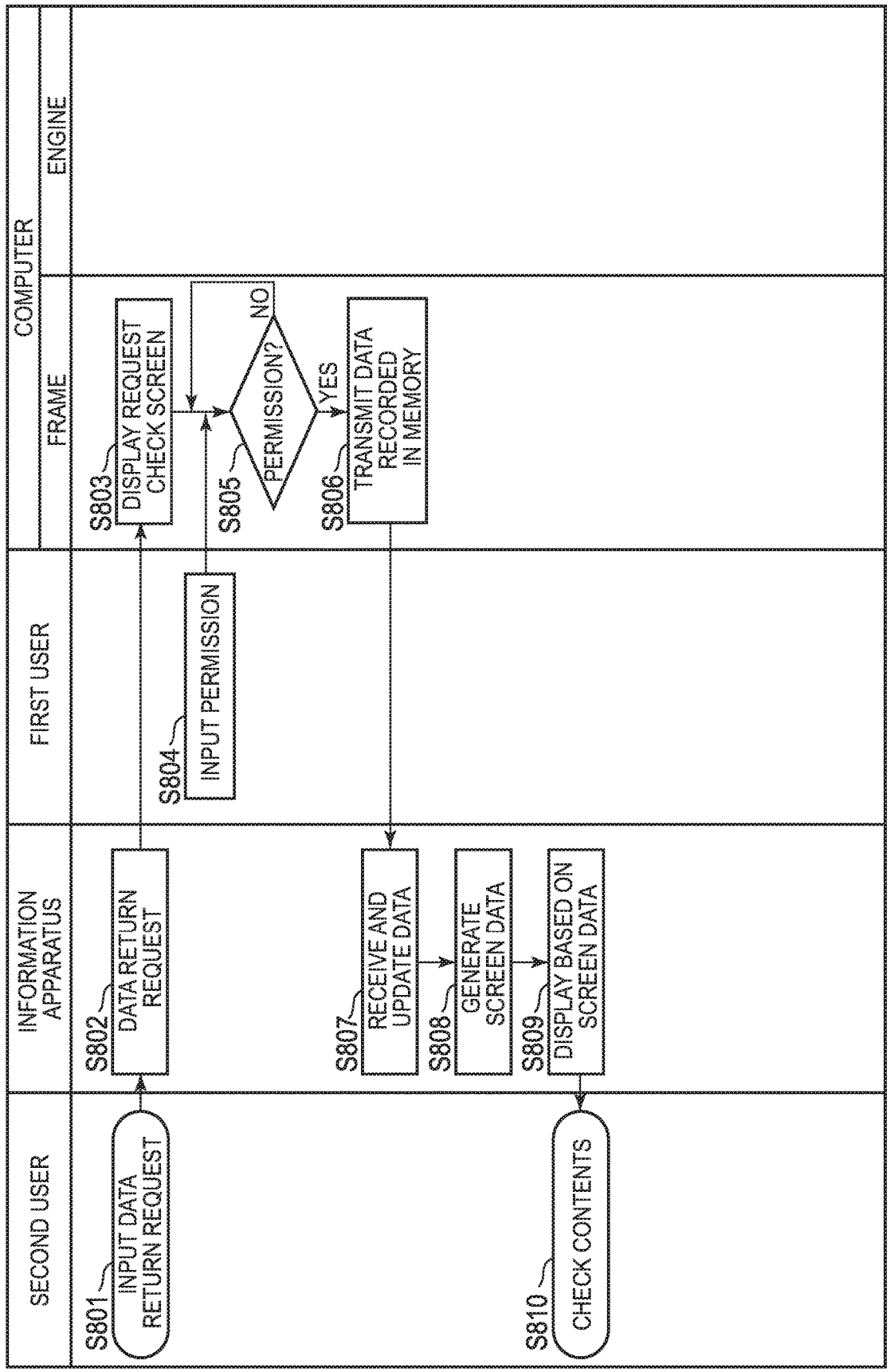

NON-VOLATILE RECORDING MEDIUM, INFORMATION PROCESSING METHOD, AND ELECTRONIC APPARATUS

CROSS-REFERENCE TO RELATED APPLICATIONS

This application is based upon and claims the benefit of priority of Japanese Patent Application No. 2017-179458 filed on Sep. 19, 2017, the entire disclosure of which is incorporated herein by reference in its entirety.

BACKGROUND

1. Technical Field

The technical field relates to a non-volatile recording medium, an information processing method, and an electronic apparatus.

2. Description of Related Art

Information apparatuses for performing various calculations, information processing, and the like, such as those used by pupils in schools, are known. Emulators for emulating the operations of such information apparatuses by personal computers (PC) or the like are also known.

For example, Internet website <URL: https://education-.ti.com/en/products/calculators/graphing-calculators/ti-nspire-cx-cas> discloses a system (Texas Instruments Inc., TI-Nspire™ CX CAS Handheld) including the above-mentioned information apparatus and emulator used in schools. In this system, an information apparatus and a PC or the like are connected using a USB interface. The system is capable of delivering, to the information apparatus, data generated by an emulator that operates on the PC or the like, and performing file management, configuration changes, etc. on the information apparatus by the PC or the like.

It is desired to improve usability when using the information apparatus and the computer in cooperation.

BRIEF SUMMARY

A non-volatile recording medium has recorded thereon a program for causing a computer of an information processing apparatus to, when displaying a virtual electronic apparatus on a first display, display a first display area and a second display area on the first display, the first display area and the second display area each respectively capable of displaying at least part of contents stored as a display target in a virtual memory of the virtual electronic apparatus, the first display area being displayed on the first display as a virtual display of the virtual electronic apparatus, and the second display area being capable of displaying, within one screen in the second display area, more contents than a maximum amount displayable within one screen in the first display area from among the stored contents of the display target.

An electronic apparatus includes: a control unit; and a storage unit, wherein, according to an instruction stored in the storage unit, the control unit is configured to: set an operation state of the electronic apparatus to a state corresponding to an operation on the electronic apparatus; execute a first transmission process of transmitting information of a first operation state indicating the operation state of the electronic apparatus, to an external apparatus; after the first transmission process, execute a first reception process of receiving, from the external apparatus, information of a second operation state indicating an operation state of a virtual electronic apparatus set in response to an operation on the virtual electronic apparatus displayed on a first display by the external apparatus, the virtual electronic apparatus corresponding to the electronic apparatus; and execute a first state setting process of setting the operation state of the electronic apparatus to the second operation state same as the operation state of the virtual electronic apparatus, based on the information of the second operation state received in the first reception process.

An information processing method is performed by an actual machine of an electronic apparatus and an information processing apparatus connected to each other, wherein the information processing apparatus: when displaying a virtual electronic apparatus on a first display, displays a first display area and a second display area on the first display, the first display area and the second display area each respectively capable of displaying at least part of contents stored as a display target in a virtual memory of the virtual electronic apparatus, the first display area being a virtual display of the virtual electronic apparatus, and the second display area being capable of displaying, within one screen in the second display area, more contents than a maximum amount displayable within one screen in the first display area from among the stored contents of the display target; and receives an operation on the first display area or the second display area, and wherein the actual machine of the electronic apparatus, in response to the operation performed on the first display area or the second display area in the information processing apparatus, changes a display of a second display included in the actual machine of the electronic apparatus to contents corresponding to the operation.

An information processing method is performed by an electronic apparatus and an information processing apparatus connected to each other, wherein the information processing apparatus: displays a virtual electronic apparatus corresponding to the electronic apparatus, on a first display; and sets an operation state of the virtual electronic apparatus, in response to an operation on the virtual electronic apparatus displayed on the first display, wherein the electronic apparatus: sets an operation state of the electronic apparatus, in response to an operation on the electronic apparatus; and executes a first transmission process of transmitting information of a first operation state indicating the operation state of the electronic apparatus to the information processing apparatus, wherein the information processing apparatus: receives the information of the first operation state transmitted in the first transmission process; and after receiving the information of the first operation state, executes a second transmission process of transmitting information of a second operation state indicating the set operation state of the virtual electronic apparatus, to the electronic apparatus, and wherein the electronic apparatus: executes a first reception process of receiving the information of the second operation state transmitted in the second transmission process; and executes a first state setting process of setting the operation state of the electronic apparatus to the second operation state same as the operation state of the virtual information apparatus, based on the information of the second operation state received in the first reception process.

BRIEF DESCRIPTION OF THE DRAWINGS

The components in the drawings are not necessarily to scale relative to each other.

FIG. 12 is a diagram schematically illustrating an example of the structure of management data for managing saved data according to the embodiment.

FIG. 13 is a flowchart schematically illustrating an example of the operation of the information processing system according to the embodiment.

FIG. 14 is a flowchart schematically illustrating an example of the operation of the information processing system according to the embodiment.

DETAILED DESCRIPTION

[Structure of Information Processing System]

Figure 1:
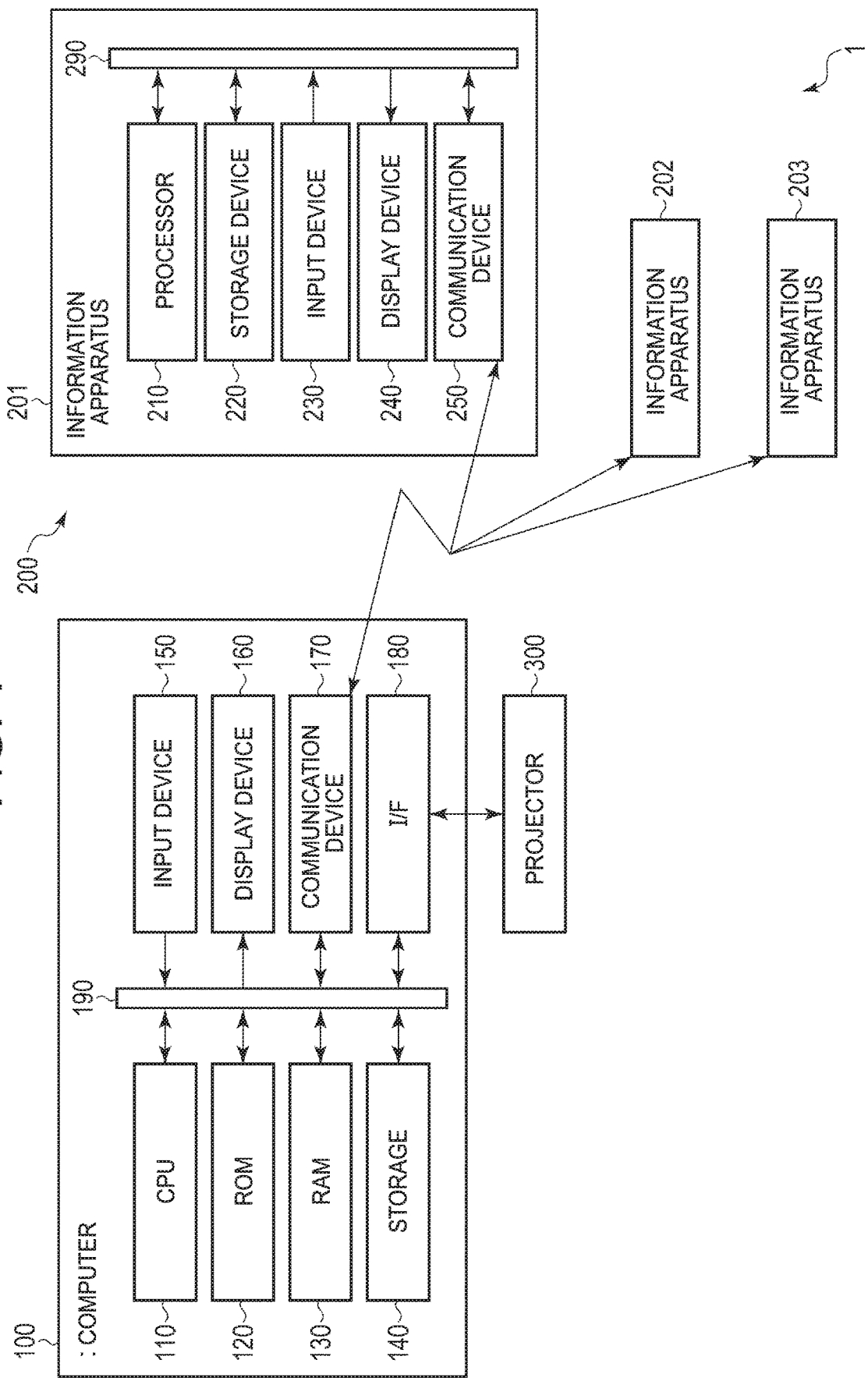
FIG. 1 is a block diagram schematically illustrating an example of the structure of an information processing system according to an embodiment.
Figure 2:
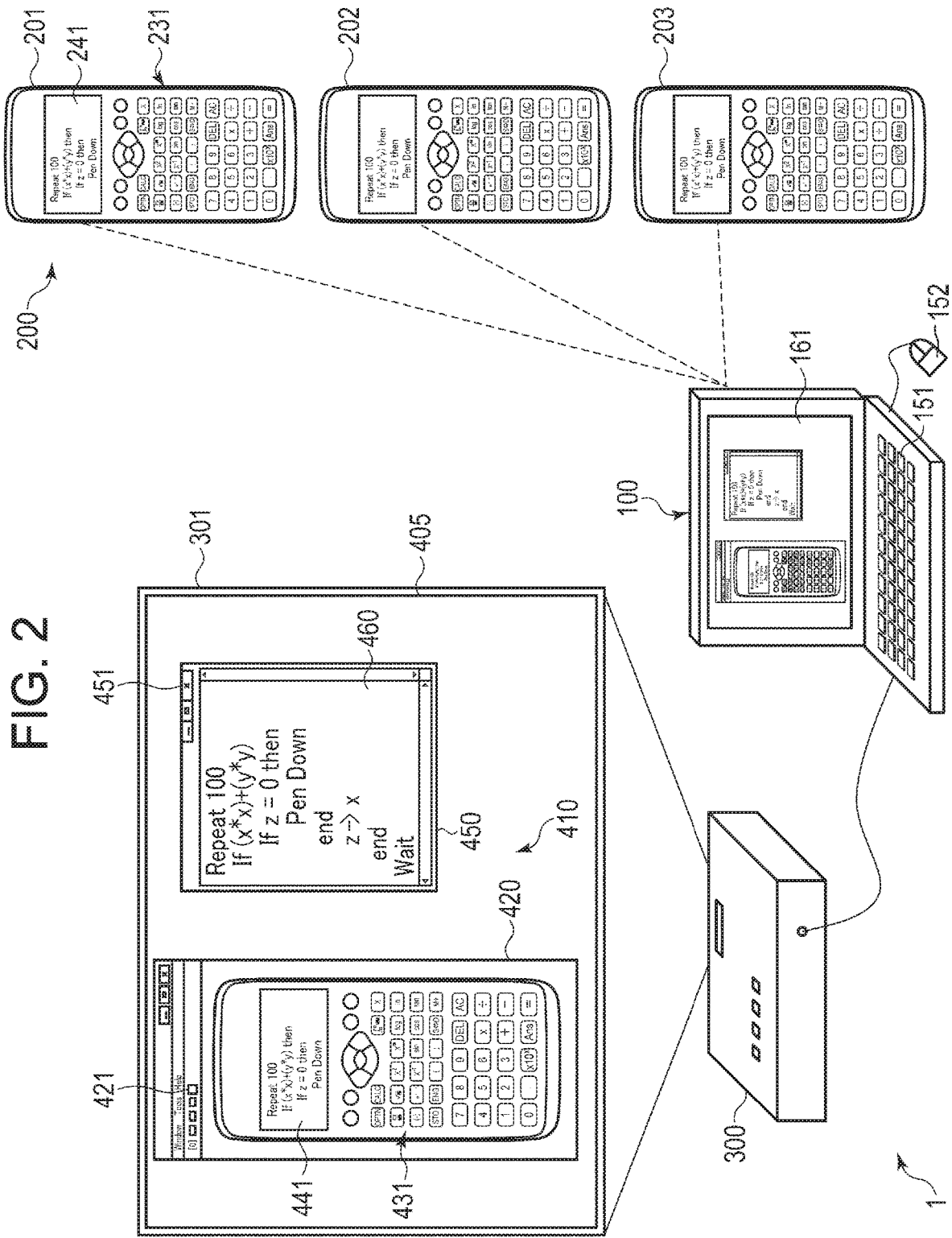
FIG. 2 is a conceptual diagram schematically illustrating an example of the structure of the information processing system according to the embodiment.

An embodiment of the present invention is described below, with reference to drawings. This embodiment relates to an information processing system including: a scientific calculator which is an actual machine as an information apparatus; and a computer in which an emulator for emulating the operation of the scientific calculator is installed. FIG. 1 is a block diagram schematically illustrating an example of the structure of an information processing system 1 according to this embodiment. FIG. 2 conceptually illustrates the information processing system 1 according to this embodiment.

The information processing system 1 includes a computer 100 and a plurality of information apparatuses (electronic apparatuses) 200 which are actual machines. The information processing system 1 may include any number of information apparatuses 200. The information processing system 1 illustrated in FIGS. 1 and 2 includes three information apparatuses 201, 202, and 203. These information apparatuses 201, 202, and 203 are similar. The information processing system 1 may also include a projector 300, as illustrated in FIGS. 1 and 2. One use mode of the information processing system 1 in a classroom is as follows: Each of a plurality of pupils operates a scientific calculator as an information apparatus. A teacher conducts a class by projecting, on a screen (first display) 301 by the projector 300, the operation of the scientific calculator emulated by emulator software in the computer 100.

<Structure of Computer>

The computer 100 may be, for example, a personal computer (PC) or a tablet electronic terminal. The computer 100 includes a central processing unit (CPU) 110, a read only memory (ROM) 120, a random access memory (RAM) 130, a storage 140, an input device 150, a display device (first display) 160, a communication device 170, and an interface (I/F) 180 connected to each other via a bus line 190.

The CPU 110 performs various signal processing and the like. The ROM 120 records a BIOS and the like. The RAM 130 functions as a main storage device of the CPU 110. The RAM 130 may be, for example, a dynamic RAM (DRAM) or a static RAM (SRAM). The storage 140 may be, for example, a hard disk drive (HDD) or a solid state drive (SSD). The storage 140 records various information such as programs and parameters used in the CPU 110. The storage 140 also records a program relating to emulator software for emulating the information apparatus 200, which is executed by the computer 100. The storage 140 stores data acquired from the information apparatus 201 and the like. The RAM 130 and the storage 140 are not a limitation, and may be substituted by various storage devices.

The input device 150 includes, for example, a keyboard 151, a mouse 152, etc. The display device 160 is, for example, a liquid crystal display (first display) 161, although not limited to such. The communication device 170 is used when communicating with apparatuses outside the computer 100. The communication device 170 may be, for example, used for communication with the information apparatuses 201, 202, and 203. This communication may be wired communication such as communication by a universal serial bus (USB), or wireless communication such as Bluetooth® or Wi-Fi®. The I/F 180 is used for connection with apparatuses outside the computer 100. In the example illustrated in FIGS. 1 and 2, the computer 100 is connected with the projector 300. For example, the projector 300 projects a screen displayed on the display device 160, onto a screen 301 as a display screen 405.

<Structure of Information Apparatus>

The information apparatus 201 which is an actual machine of a scientific calculator as an example includes a processor 210, a storage device 220, an input device 230, a display device 240, and a communication device 250 connected to each other via a bus line 290. The processor 210 performs various computations relating to the information apparatus 201. The processor 210 includes an integrated circuit such as a CPU, an application specific integrated circuit (ASIC), or a field programmable gate array (FPGA). The processor 210 may be composed of one integrated circuit or the like, or composed of a combination of a plurality of integrated circuits or the like. The processor 210 operates according to, for example, a program recorded in the storage device 220 or included in the processor 210. The storage device 220 may include any of various semiconductor memories such as ROM, RAM, and flash memory. The storage device 220 stores instructions, programs, and the like input by the user. The information apparatuses 201, 202, 203, etc. are each assigned a unique ID. The storage device 220 stores this ID unique to the apparatus. The storage capacity of the storage device 220 is assumed to be small, in view of the economy, convenience, energy saving, etc. of the information apparatus 200.

The input device 230 includes, for example, a plurality of input keys 231. The user inputs various instructions and program code to the information apparatus 201 using the input device 230. The display device 240 includes, for example, a liquid crystal display (second display) 241. The display device 240 displays input results by the user, calculation results by the processor 210, and the like. The communication device 250, for example, performs communication with the communication device 170 in the computer 100.

[Operation of Information Processing System]
<Operation of Information Apparatus>

Figure 3:
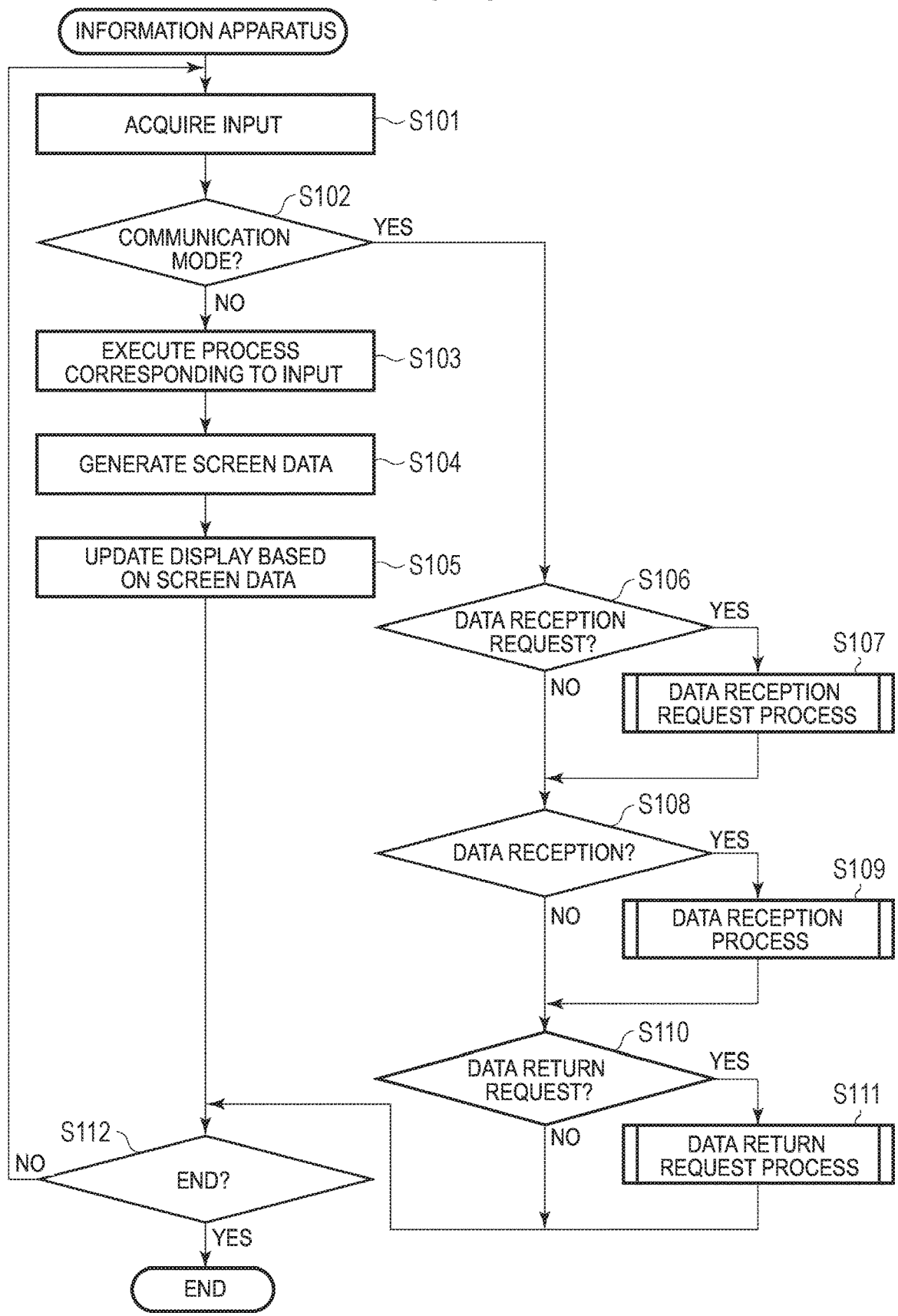
FIG. 3 is a flowchart schematically illustrating an example of the operation of an information apparatus according to the embodiment.

The operation of the information apparatus 200 which is an actual machine of a scientific calculator as an example is described below, with reference to a flowchart in FIG. 3. The information apparatus 200 has a calculation mode of functioning as a scientific calculator individually, and a communication mode of communicating and cooperating with the computer 100 or the like. The user can select a mode, by opening a menu screen of the information apparatus 200 and performing a selection operation on the menu screen. In the calculation mode, the information apparatus 200 acquires information about which input key 231 has been pressed by the user, and performs a process corresponding to the user input, such as four arithmetic operations, computation of various functions, program code editing, or program execution. In the communication mode, the information apparatus 200 transmits an input to the information apparatus 200, a computation result of the information apparatus 200, program code edited by the information apparatus 200, an execution result of a program executed by the information apparatus 200, or the like, to the computer 100. In the communication mode, the information apparatus 200 also receives an input to the emulator in the computer 100, a computation result of the emulator, program code edited by the emulator, an execution result of a program executed by the emulator, or the like, from the computer 100.

In step S101, the processor 210 acquires an input to the input key 231. In step S102, the processor 210 determines whether or not the currently selected mode is the communication mode. In the case where the currently selected mode is not the communication mode, i.e. the currently selected mode is the calculation mode, the process advances to step S103.

In step S103, the processor 210 executes a process corresponding to the input. In step S104, the processor 210 generates screen data corresponding to the process in step S103. In step S105, the processor 210 updates the display of the liquid crystal display 241, based on the data generated in step S104. The process then advances to step S112.

For example, when the user inputs a calculation formula using the input key 231, the processor 210, while storing the input value, text, function, etc. in the storage device 220, displays the input value, etc. on the liquid crystal display 241. When the user inputs calculation execution using the input key 231, the processor 210 performs calculation for the calculation formula stored in the storage device 220 to obtain a calculation result, and stores the obtained calculation result in the storage device 220. The processor 210 also displays the obtained calculation result on the liquid crystal display 241.

Likewise, when the user inputs a program using the input key, the processor 210, while storing the input text, etc. in the storage device 220, displays the input text, etc. on the liquid crystal display 241. When the user inputs program execution using the input key 231, the processor 210 executes the program stored in the storage device 220. When the processor 210 requests an input from the user by the program execution, the processor 210 displays the request on the liquid crystal display 241. When a calculation result or the like to be displayed is obtained, the processor 210 stores the result or the like in the storage device 220, and displays the result or the like on the liquid crystal display 241.

In the case where it is determined that the currently selected mode is the communication mode in step S102, the process advances to step S106. In step S106, the processor 210 determines whether or not the user has performed an input to make a data reception request using the input key 231. In the case where an input to make a data reception request has not been performed, the process advances to step S108. In the case where an input to make a data reception request has been performed, the process advances to step S107.

In step S107, the processor 210 executes a data reception request process. In the data reception request process, the processor 210 performs a process of communicating with the computer 100 and starting reception of various data from the computer 100. The data reception request process includes a process of transmitting data stored in the storage device 220 to the computer 100 and causing the data to be stored in the storage 140 of the computer 100. The data reception request process will be described later. After the data reception request process, the process advances to step S108.

In step S108, the processor 210 determines whether or not data has been received from the computer 100. In the case where data has not been received, the process advances to step S110. In the case where data has been received, the process advances to step S109. In step S109, the processor 210 executes a data reception process. In the data reception process, the processor 210 stores the data received from the computer 100 in the storage device 220, performs each process based on the data received from the computer 100, or displays the data received from the computer 100 on the liquid crystal display 241. The data reception process will be described later. After the data reception process, the process advances to step S110.

In step S110, the processor 210 determines whether or not the user has performed an input to make a data return request using the input key 231. In the case where an input to make a data return request has not been performed, the process advances to step S112. In the case where an input to make a data return request has been performed, the process advances to step S111.

In step S111, the processor 210 executes a data return request process. In the data return request process, the processor 210 communicates with the computer 100, and requests the return of the data stored in the storage device 220 of the information apparatus 200 and saved to the storage 140 of the computer 100. The processor 210 stores the returned data in the storage device 220. The data return request process will be described later. After the data return request process, the process advances to step S112.

In step S112, the processor 210 determines whether or not to end the process. For example, when an operation of turning off the information apparatus 200 is performed, the processor 210 determines to end the process. In the case of ending the process, the processor 210 performs a process for ending the process of the information apparatus 200. In the case of not ending the process, the process returns to step S101, and the above-mentioned process is repeated.

<Operation of Computer>

A process performed using the emulator on the computer 100 is described below. The emulator emulates the operation of the information apparatus 200 which is a scientific calculator as an example.

Figure 4:
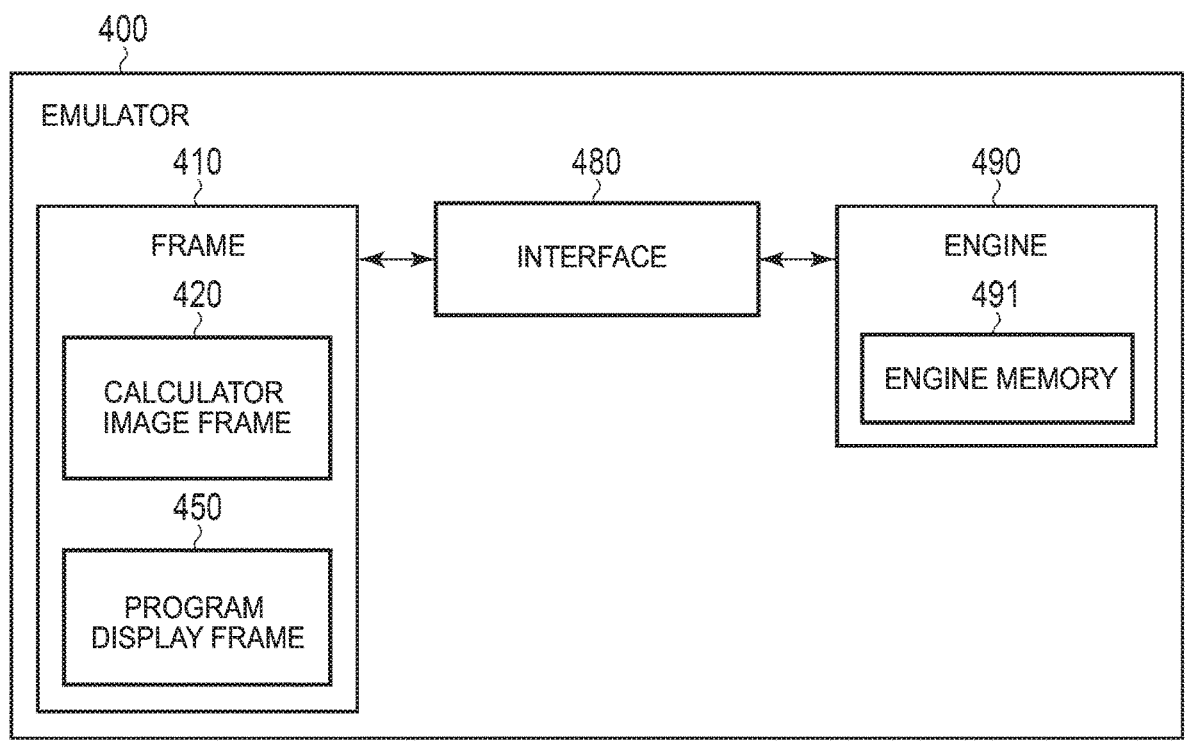
FIG. 4 is a block diagram schematically illustrating an example of the structure of an emulator executed by a computer according to the embodiment.

The basic operation of the emulator according to this embodiment is described below. As illustrated in FIG. 4, the emulator 400 as software executed by the computer 100 includes a frame 410, an interface 480, and an engine 490. The frame 410 manages buttons used by a user to perform operations, a display used by the user to view operation results, and the like. Thus, the frame 410 is a user interface for transmitting an operation instruction to the engine and transferring a computation result of the engine to the user. The engine 490 replicates the behavior of the scientific calculator. The engine 490 has an engine memory 491 corresponding to the storage device 220 of the information apparatus 200. The frame 410 and the engine 490 are connected via the interface 480.

As illustrated in FIGS. 2 and 4, the frame 410 includes a calculator image frame 420 and a program display frame 450. The calculator image frame 420 is a basic frame of the emulator. The calculator image frame 420 displays the appearance of the scientific calculator as the information apparatus 200, thus displaying a virtual electronic apparatus. The program display frame 450 is a frame that can be displayed depending on selection by the user. The program display frame 450 is a frame for displaying code of a program generated by the emulator 400.

The calculator image frame 420 includes an input key display 431. The input key display 431 is a display imitating the input key 231 of the information apparatus 200. By selecting, using a mouse or the like, the display of the input key included in the input key display 431 on the computer 100, the user can perform, on the emulator 400, the same input as when pressing the input key 231 of the information apparatus 200. The calculator image frame 420 includes a display area (first display area; a virtual display of the virtual electronic apparatus) 441. The display area 441 is used to produce a display imitating the liquid crystal display 241 of the information apparatus 200. In the case where the liquid crystal display 241 of the information apparatus 200 is capable of 4-row display, the display area 441 of the calculator image frame 420 is also capable of 4-row display.

The program display frame 450 displays program code stored in the engine memory 491 of the engine 490, when the emulator 400 is executing a program function. The program display frame 450 includes a code display area (second display area) 460. The code display area 460 is capable of displaying many rows, regardless of the number of displayable rows of the liquid crystal display 241 of the information apparatus 200. Thus, the code display area 460 is capable of simultaneously displaying more information than the liquid crystal display 241.

In detail, when displaying a virtual information apparatus on the liquid crystal display 161 or the screen 301, the liquid crystal display 241 of the information apparatus 200 or the display area 441 of the calculator image frame 420 may be capable of simultaneously displaying contents corresponding to n rows within the screen, and the code display area 460 of the program display frame 450 may be capable of simultaneously displaying contents corresponding to n+1 rows or more (i.e. more than n rows) within the screen, on the liquid crystal display 161 or the screen 301.

In detail, as illustrated in FIG. 2, when displaying the virtual information apparatus on the liquid crystal display 161 or the screen 301, the display area 441 and the code display area 460 each having, as a display target, the storage contents (whole program code) of the virtual memory of the virtual information apparatus are displayed on the liquid crystal display 161 or the screen 301. In this case, the display area 441 is a display area as a virtual display of the virtual information apparatus, and the maximum amount displayable simultaneously within the screen of the display area 441 is fixed. Meanwhile, more contents than the maximum amount displayable simultaneously within the screen of the display area 441 are displayable simultaneously within the screen of the code display area 460.

Moreover, as illustrated in FIG. 2, when displaying the virtual information apparatus on the liquid crystal display 161 or the screen 301, the code display area 460 of the program display frame 450 displayed on the liquid crystal display 161 or the screen 301 may display at least the same contents (e.g. 4-row display) as the contents displayed on the liquid crystal display 241 in the actual machine 200 corresponding to the virtual information apparatus, and simultaneously display more contents (e.g. 8-row display) than the maximum amount displayable simultaneously in the display area 441.

The program display frame 450 is started and displayed when a program display frame start button 421 included in the calculator image frame 420 is selected, and ended and hidden when a close button 451 is selected.

Figure 5:
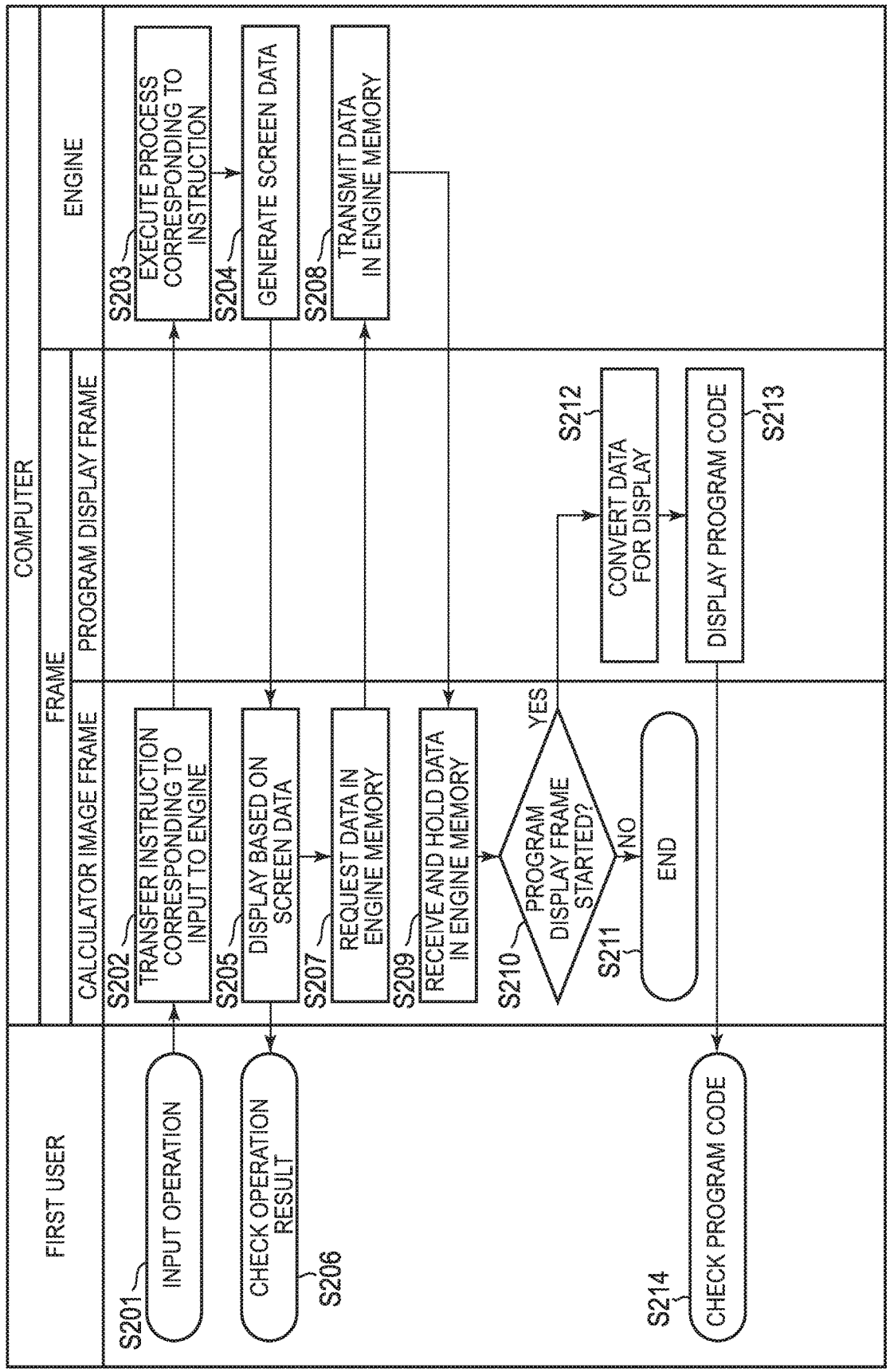
FIG. 5 is a flowchart schematically illustrating an example of the operation of the emulator according to the embodiment.

The operation of the emulator 400 is described below, with reference to FIG. 5. In step S201, suppose the user performs an input by selecting the input key display 431 of the calculator image frame 420. In step S202, the calculator image frame 420 transfers an instruction corresponding to the input, to the engine 490. In step S203, having received the instruction, the engine 490 executes a process corresponding to the instruction. In step S204, the engine 490 generates screen data corresponding to the process in step S203, and passes it to the calculator image frame 420. In step S205, based on the received screen data, the calculator image frame 420 displays a screen based on the screen data in the display area 441 of the calculator image frame 420. In step S206, the user views the screen displayed in the display area 441, and checks the operation result of the operation performed by the user.

For example, when the user inputs a calculation formula using the input key display 431, the engine 490 generates a screen to be displayed in the display area 441 of the calculator image frame 420, while storing the input value, text, function, etc. in the engine memory 491. Consequently, the input value, etc. is displayed in the display area 441 of the calculator image frame 420. When the user inputs calculation execution using the input key display 431, the engine 490 performs calculation for the calculation formula stored in the engine memory 491 to obtain a calculation result, and stores the obtained calculation result in the engine memory 491. The engine 490 also generates screen data, in order to display the obtained calculation result in the display area 441 of the calculator image frame 420. Consequently, the calculation result is displayed in the display area 441 of the calculator image frame 420.

In step S207, the calculator image frame 420 requests data in the engine memory 491 from the engine 490. In step S208, having received the request, the engine 490 transmits the data in the engine memory 491 to the calculator image frame 420. In step S209, the calculator image frame 420 receives the data in the engine memory 491, and holds the value of the data.

In step S210, the calculator image frame 420 determines whether or not the program display frame 450 has been started. In the case where the program display frame 450 has not been started, the process ends in step S211. In the case where the program display frame 450 has been started, the process advances to step S212.

In step S212, the program display frame 450 receives the data in the engine memory 491 from the calculator image frame 420, and converts the data in order to display the program code in the code display area 460. This data conversion involves, for example, conversion to data suitable for the operating system (OS) of the computer 100 and the like. For example, the program display frame 450 extracts a part relating to the program code from among the data in the engine memory 491, and generates a screen for displaying the program code in a suitable display form. In step S213, the program display frame 450 displays the program code in the code display area 460, based on the converted data. In step S214, the user checks the program code displayed in the code display area 460.

Thus, when displaying, in the display area 441 of the calculator image frame 420, first contents which are at least part of the whole program code stored in the virtual memory of the virtual information apparatus, in the case where the code display area 460 of the program display frame 450 is displayed on the liquid crystal display 161 or the screen 301, second contents (the second contents includes at least the first contents) which are at least part of the contents of the display target may be displayed in the code display area 460. In the case where the code display area 460 of the program display frame 450 is not displayed on the liquid crystal display 161 or the screen 301, the second contents may be not displayed on the liquid crystal display 161 or the screen 301, and, in response to receiving an instruction to display the code display area 460 of the program display frame 450 on the liquid crystal display 161 or the screen 301, the code display area 460 may be displayed on the liquid crystal display 161 or the screen 301, and the second contents may be displayed in the code display area 460.

As described above, the user can check the operation of the emulated information apparatus 200, by operating the calculator image frame 420. Moreover, the user can check the program code stored in the engine memory 491 with high perspicuity, by displaying the program code in the large code display area 460 of the program display frame 450.

Figure 6:
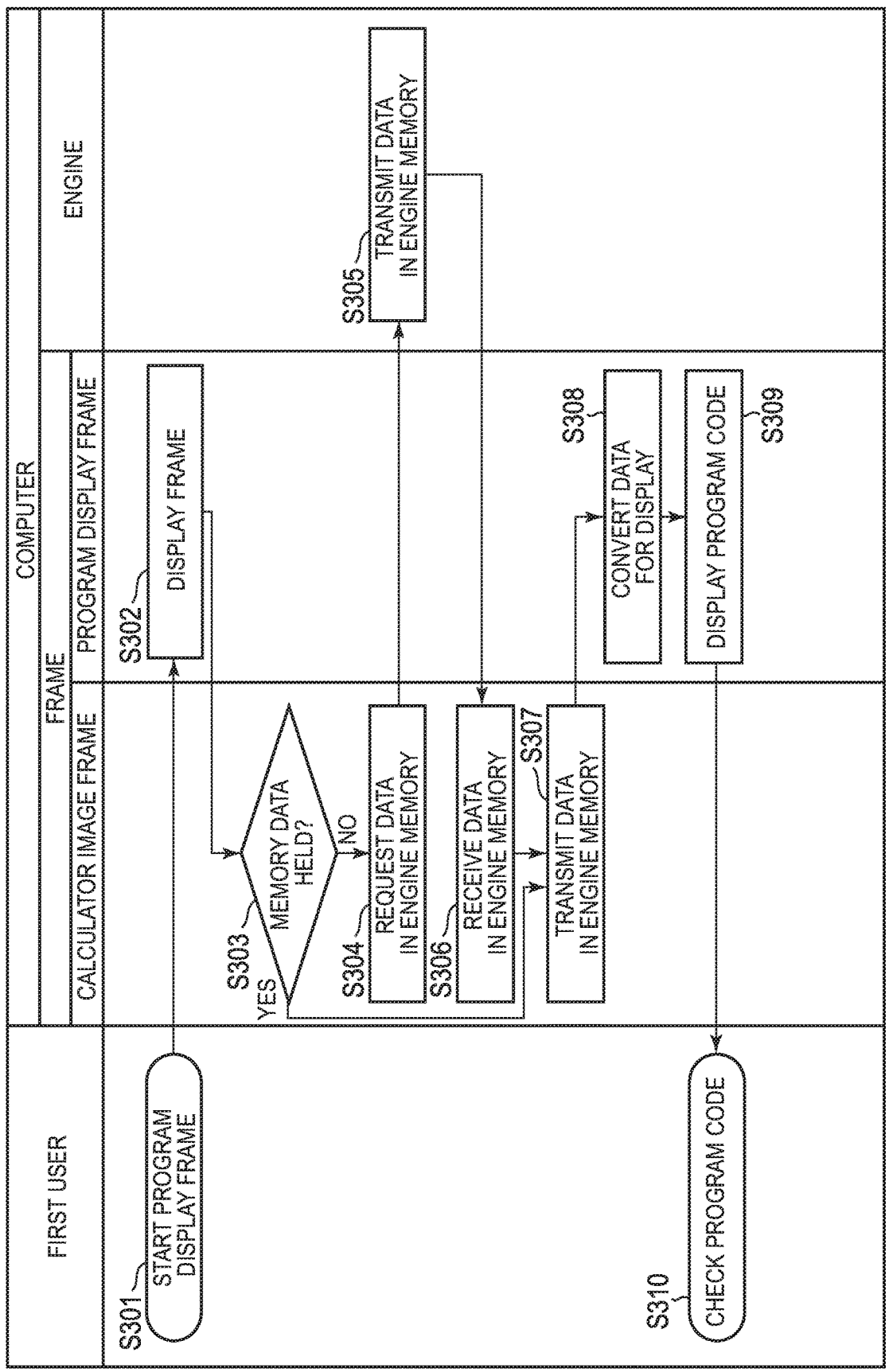
FIG. 6 is a flowchart schematically illustrating an example of the operation of the emulator according to the embodiment.

The starting operation of the program display frame 450 is described below, with reference to a flowchart illustrated in FIG. 6.

In step S301, the user performs an operation of starting the program display frame 450, by selecting the program display frame start button 421. In step S302, the frame 410 starts and displays the program display frame 450.

In step S303, the calculator image frame 420 determines whether or not the data in the engine memory 491 is held. For example, in the case where the data has been received and held in step S209 in the process described with reference to FIG. 5, the calculator image frame 420 determines that the data in the engine memory 491 is held. In the case where the data is not held, the process advances to step S304. In step S304, the calculator image frame 420 requests the data in the engine memory 491 from the engine 490. In step S305, the engine 490 transmits the data in the engine memory 491 to the calculator image frame 420. In step S306, the calculator image frame 420 receives the data in the engine memory 491 from the engine 490. The process then advances to step S307.

In the case where it is determined that the data in the engine memory 491 is held in step S303, the process advances to step S307. In other words, the calculator image frame 420 holds the data in the engine memory 491 when performing the process in step S307.

In step S307, the calculator image frame 420 transmits the data in the engine memory 491 to the program display frame 450. In step S308, the program display frame 450 receives the data in the engine memory 491 from the calculator image frame 420, and converts the data in order to display the program code in the code display area 460. In step S309, the program display frame 450 displays the program code in the code display area 460, based on the converted data. In step S310, the user checks the program code displayed in the code display area 460.

Thus, in the case where the code display area 460 of the program display frame 450 is not displayed on the liquid crystal display 161 or the screen 301, in response to receiving an instruction to display the code display area 460 of the program display frame 450 on the liquid crystal display 161 or the screen 301, the code display area 460 may be displayed on the liquid crystal display 161 or the screen 301, and the second contents (the second contents includes at least the first contents) which are at least part of the contents of the display target may be displayed in the code display area 460.

As described above, each time the program display frame start button 421 is selected, the program code is displayed in the code display area 460 of the program display frame 450. For example, even in the case where it is determined that the program display frame 450 has not been started in step S210 in the process illustrated in FIG. 5 and the program code has not been displayed, when the program display frame start button 421 is selected subsequently, the program display frame 450 is displayed, and the program code is displayed in the code display area 460 of the program display frame 450. Regardless of whether the calculator image frame 420 holds the data in the engine memory 491 including the program code, the program code is displayed in the code display area 460 along with the start of the program display frame 450.

Figure 7:
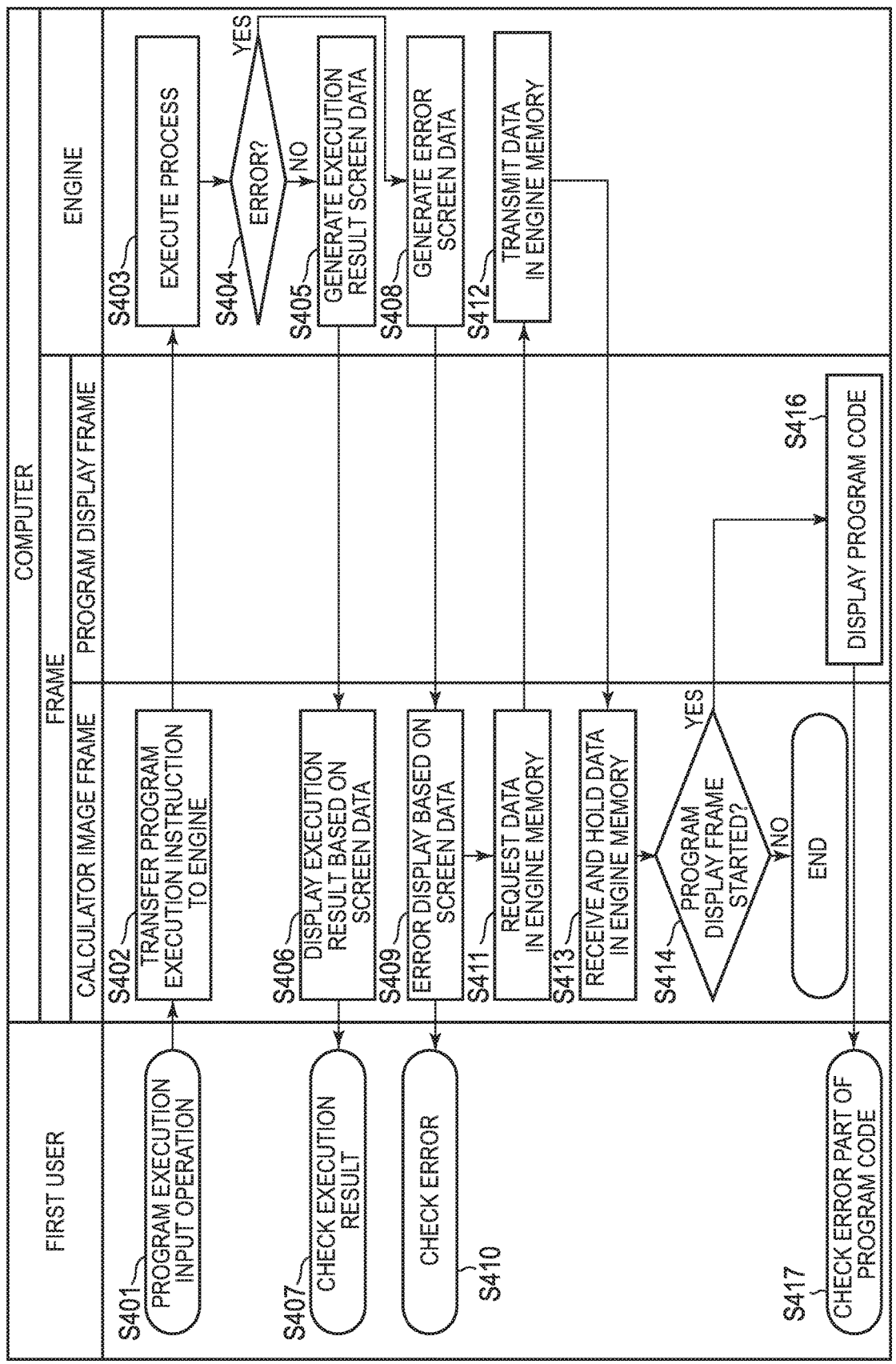
FIG. 7 is a flowchart schematically illustrating an example of the operation of the emulator according to the embodiment.

The operation when executing the program in the emulator 400 is described below, with reference to a flowchart illustrated in FIG. 7.

In step S401, the user performs an operation of executing the program, by selecting the input key display 431 of the calculator image frame 420. In step S402, the calculator image frame 420 transfers a program execution instruction to the engine 490. In step S403, having received the program execution instruction, the engine 490 executes the program whose code is stored in the engine memory 491.

In step S404, the engine 490 determines whether or not an error has occurred in the program execution. In the case where no error has occurred, the process advances to step S405. In step S405, the engine 490 generates screen data indicating the execution result, and transfers it to the calculator image frame 420.

In step S406, having received the screen data, the calculator image frame 420 displays the execution result in the display area 441 based on the screen data. In step S407, the user checks the execution result of the program, through the display in the display area 441 of the calculator image frame 420.

In the case where it is determined that an error has occurred in step S404, the process advances to step S408. In step S408, the engine 490 generates error screen data to be displayed in the display area 441 of the calculator image frame 420, and transfers it to the calculator image frame 420.

Figure 8:
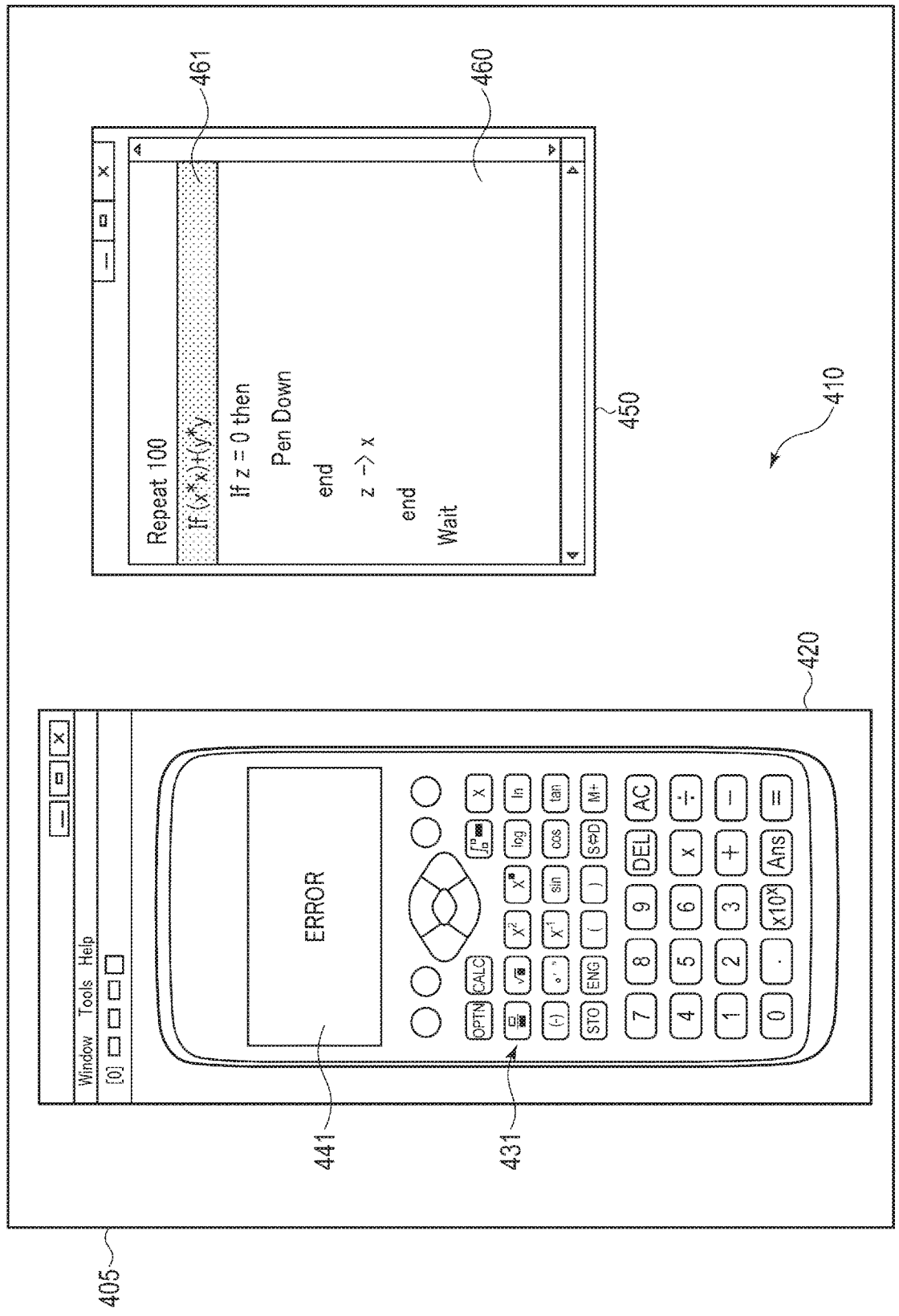
FIG. 8 is a diagram schematically illustrating a display example of a frame of the emulator according to the embodiment.

In step S409, having received the screen data, the calculator image frame 420 displays an error screen in the display area 441 based on the screen data. For example, text "ERROR" indicating the occurrence of an error in the code display area 460 is displayed, as illustrated in FIG. 8. This display is the same as the display produced on the liquid crystal display 241 of the information apparatus 200 when an error occurs. In step S410, the user checks that an error has occurred in the program execution, through the display in the display area 441 of the calculator image frame 420.

In step S411, the calculator image frame 420 requests the data in the engine memory 491 from the engine 490. In step S412, having received the request, the engine 490 transmits the data in the engine memory 491 to the calculator image frame 420. In step S413, the calculator image frame 420 receives the data in the engine memory 491, and holds the value of the data.

In step S414, the calculator image frame 420 determines whether or not the program display frame 450 has been started. In the case where the program display frame 450 has not been started, the process ends in step S415. In the case where the program display frame 450 has been started, the process advances to step S416.

In step S416, the program display frame 450 receives the data in the engine memory 491 from the calculator image frame 420. The data in the engine memory 491 includes information relating to the part at which the error has occurred. Based on this information, the program display frame 450 highlights the part at which the error has occurred in the program code displayed in the code display area 460. For example, the row involving the error is displayed with a highlight 461, as in the display screen 405 illustrated in FIG. 8. In step S417, the user checks the error part in the program code displayed in the code display area 460.

As described above, in the case where the program is executed according to the contents stored in the virtual memory of the virtual information apparatus and an error associated with the program execution occurs, information notifying the occurrence of the error may be displayed in the display area 441 of the calculator image frame 420, and the program code may be displayed in the code display area 460 of the program display frame 450 so that the part at which the error has occurred in the program code is visually distinguishable from the other parts of the program code, on the liquid crystal display 161 or the screen 301.

By clearly indicating the error part in the program display frame 450 in this way, the user can easily recognize the error part.

Even in the case where the program display frame 450 has not been started and the process ends in step S415 at the time of the occurrence of the error, the error part may be highlighted when the program display frame 450 is started subsequently. In detail, upon the start of the program display frame 450, the program display frame 450 acquires the data in the engine memory 491 including the information relating to the error part, as described with reference to FIG. 6. Based on this data, the program display frame 450 can highlight the error part.

Figure 9:
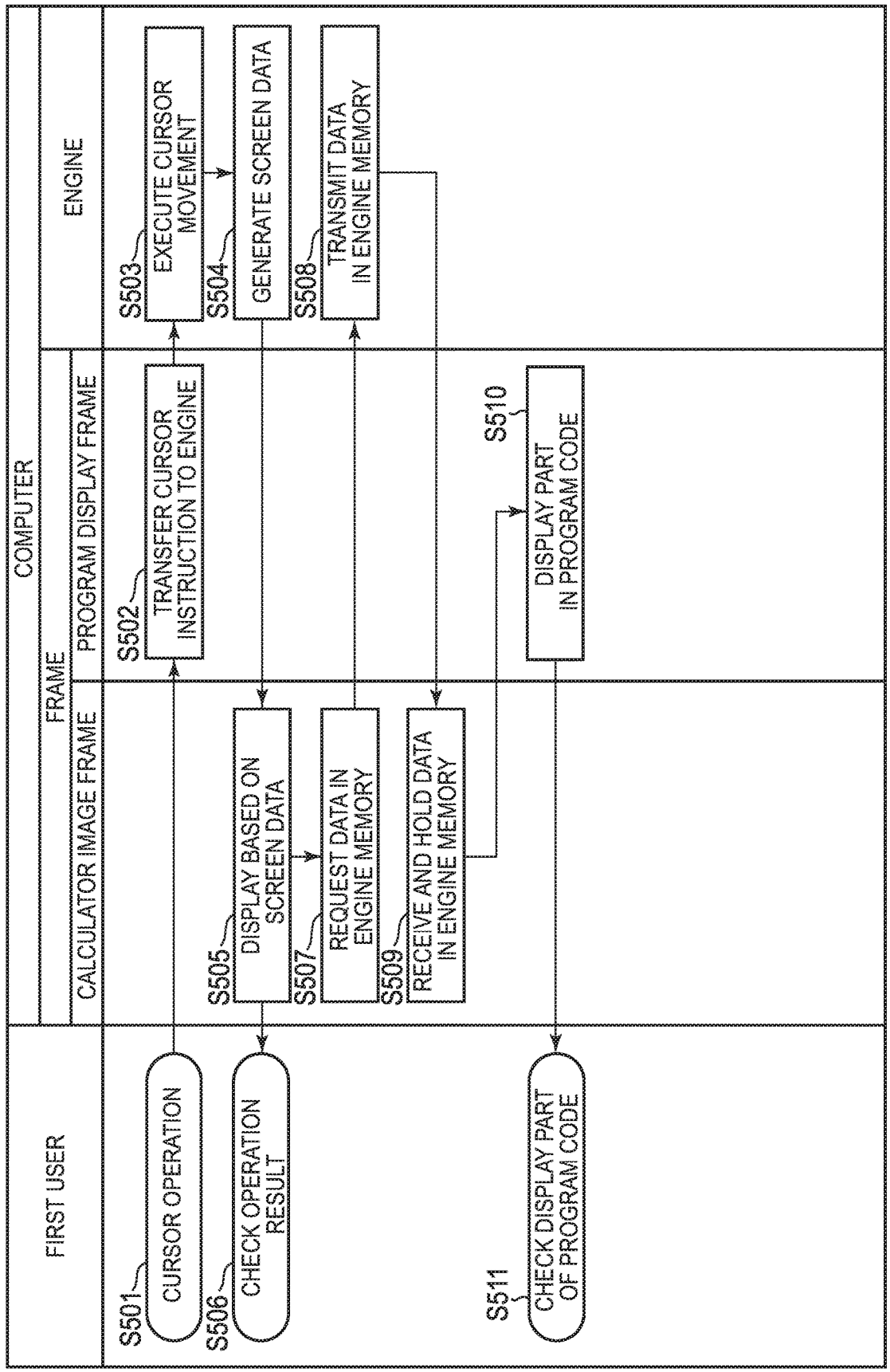
FIG. 9 is a flowchart schematically illustrating an example of the operation of the emulator according to the embodiment.

In this embodiment, the cursor position in the program code can be designated using not only the calculator image frame 420 but also the program display frame 450. The operation of cursor position designation using the program display frame 450 is described below, with reference to a flowchart illustrated in FIG. 9.

In step S501, the user designates the cursor position, by selecting a desired part in the code display area 460 of the program display frame 450. In step S502, the program display frame 450 transfers an instruction to designate the cursor position, to the engine 490. In step S503, having received the cursor position designation instruction, the engine 490 executes a process of moving the cursor position. In step S504, the engine 490 generates screen data relating to the program code after the cursor movement, and transfers it to the calculator image frame 420.

In step S505, having received the screen data, the calculator image frame 420 displays the program code after the cursor movement in the display area 441 based on the screen data. In step S506, the user checks the result of the cursor movement operation, through the display in the display area 441 of the calculator image frame 420.

In step S507, the calculator image frame 420 requests the data in the engine memory 491 from the engine 490. In step S508, having received the request, the engine 490 transmits the data in the engine memory 491 to the calculator image frame 420. In step S509, the calculator image frame 420 receives the data in the engine memory 491, and holds the value of the data.

Figure 10:
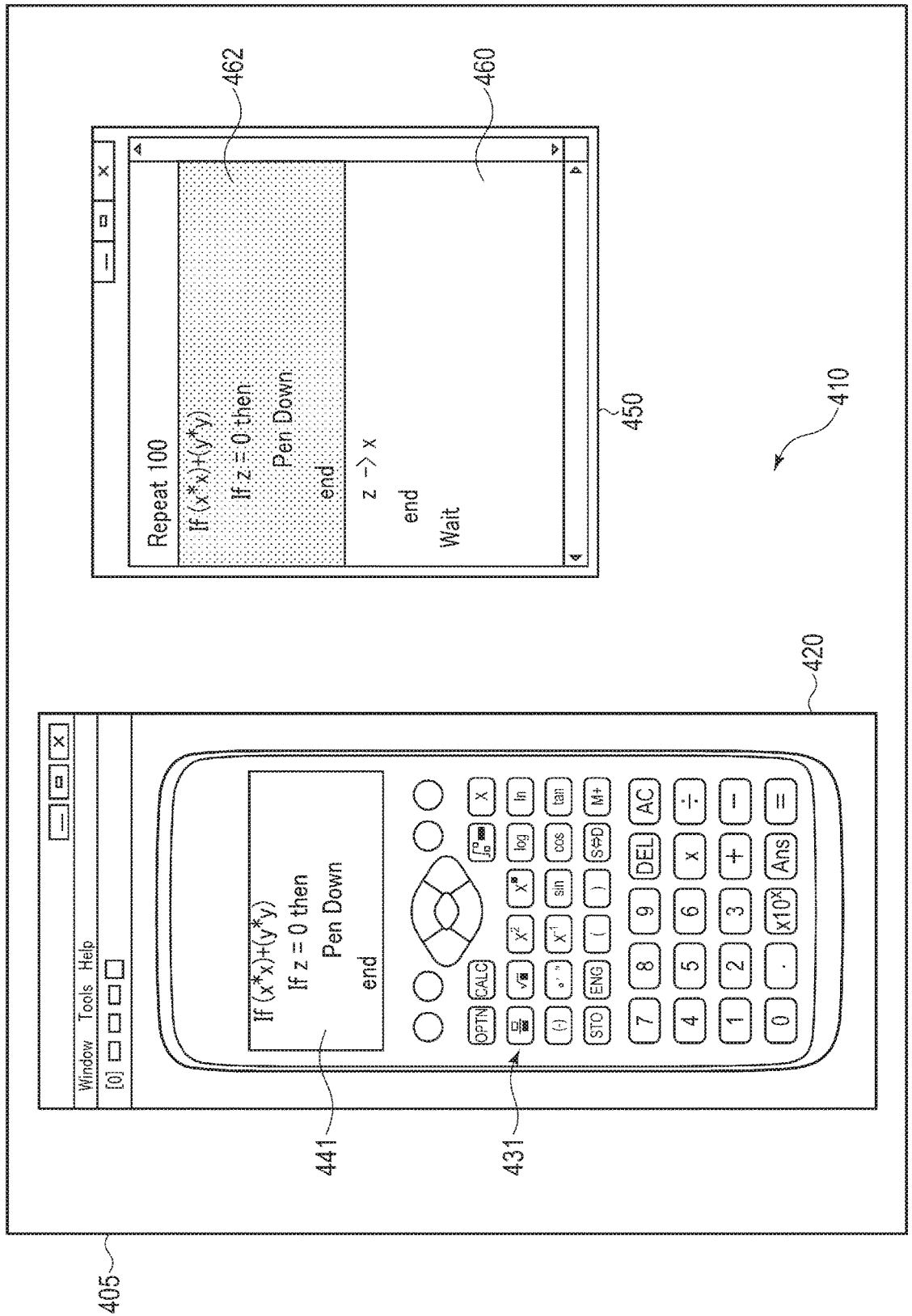
FIG. 10 is a diagram schematically illustrating a display example of the frame of the emulator according to the embodiment.

In step S510, the program display frame 450 receives the data in the engine memory 491 from the calculator image frame 420, and specifies the rows displayed in the display area 441 of the calculator image frame 420 from among the program code. The program display frame 450 highlights the rows displayed in the display area 441 of the calculator image frame 420, in the program code displayed in the code display area 460. For example, the rows displayed in the display area 441 of the calculator image frame 420 are displayed with a highlight 462, as in the display screen 405 illustrated in FIG. 10. In step S511, the user checks the part displayed in the display area 441 of the calculator image frame 420, in the program code displayed in the code display area 460.

As described above, when displaying, in the code display area 460 of the program display frame 450 displayed on the liquid crystal display 161 or the screen 301, the contents (the contents of the display target) stored in the virtual memory of the virtual information apparatus, the contents displayed in the display area 441 and the code display area 460 may be made visually distinguishable from the contents not displayed in the display area 441 but displayed in the code display area 460.

Thus, the user can move the cursor position in the program code using the program display frame 450 in which many rows are displayed. This improves operability for the user. In addition, since the part displayed in the display area 441 of the calculator image frame 420 from among the program code displayed in the program display frame 450 is clearly indicated, the user can easily recognize the correspondence relationship between these data.

Although the above describes an example of changing the cursor position in the program display frame 450, the frame 410 may operate in the same way even in the case of scrolling the display of the program display frame 450. For example, when the display of the code display area 460 of the program display frame 450 is scrolled, information indicating the movement of the cursor position in response to the scroll is transferred from the program display frame 450 to the engine 490. The engine 490 then executes a process corresponding to the change of the cursor position, so that the display of the display area 441 of the calculator image frame 420 can be updated in response to the scroll of the program display frame 450.

As described above, in response to receiving a scroll operation on one display area out of the display area 441 of the calculator image frame 420 and the code display area 460 of the program display frame 450, the display contents of the one display area may be scrolled, and also the display contents of the other display area out of the display area 441 of the calculator image frame 420 and the code display area 460 of the program display frame 450 may be scrolled.

The above describes an example in which the display of the display area 441 of the calculator image frame 420 is updated when an operation of changing the cursor position is performed in the program display frame 450. Likewise, when the cursor position is moved by an operation using the calculator image frame 420, too, the highlight position indicating the rows displayed in the display area 441 of the calculator image frame 420 may be changed in the code display area 460 of the program display frame 450.

Although the above describes improving the perspicuity of program code in the program display frame 450 in which program code is displayed, such operation may also be applied to other than program code. For example, in the case where the frame 410 includes a table frame for displaying a table, the above-mentioned operation may be applied to the display of the table frame. The table frame provides, for example, an effect of displaying such a large table that cannot be displayed in the display area 441 of the calculator image frame 420 simultaneously.

Although the above describes an example of changing the cursor position in the program code displayed in the program display frame 450, the operations are not limited to cursor position change and scroll operation, and program code input may be performed using the program display frame 450. Such operation can be realized by the program display frame 450 transferring the input information to the engine 490 and the engine 490 rewriting the data in the engine memory 491 with the input information.

Although the above describes an example in which the error part or the part displayed in the display area 441 is highlighted in the program display frame 450, the part subjected to highlighting is not limited to such. For example, an edited part may be highlighted. To specify the edited part, the previously acquired data in the engine memory 491 and the most recently acquired data in the engine memory 491 which have been held may be compared to specify a different part as the edited part.

An example of the operation of the emulator 400 that operates on the computer 100 has been described above. The use of the emulator 400 enables, for example, the operation of the information apparatus 200 which is a scientific calculator to be emulated on a PC. Moreover, the use of a frame other than the calculator image frame 420 makes it possible to, for example, realize a more convenient display function than that of the information apparatus 200. For example, more information than that displayed on the liquid crystal display 241 of the information apparatus 200 is displayed simultaneously, or an error part of the program is clearly indicated. The use of a frame other than the calculator image frame 420 also realizes, for example, more convenient operation than that of the information apparatus 200. For example, scroll operation, input operation, etc. are easier than in the case of using the information apparatus 200.

<Cooperation of Information Apparatus and Computer>

In the information processing system 1 according to this embodiment, the computer 100 and the information apparatus 200 which is an actual machine can communicate and cooperate with each other. One scene in which such cooperation is used is a scene of a class in a classroom. A teacher operates the emulator 400 for the information apparatus on the computer 100 such as a PC, and projects the screen of the operation using the projector 300 to present it to pupils. A plurality of pupils each have, at hand, the information apparatus 200 which is an actual machine of a scientific calculator as an example, and operates the information apparatus 200.

In the information processing system 1 according to this embodiment, the information apparatus 200 operated by each pupil can request and receive data stored in the engine memory 491 of the emulator 400 operated by the teacher. By storing, in the storage device 220 of the information apparatus 200, the data in the engine memory 491 and using the stored data as data of the information apparatus 200, the information apparatus 200 can perform the same operation as the emulator 400. For example, each pupil can replicate the operation performed by the teacher on the emulator 400, using the information apparatus 200 at hand.

In the information apparatus 200 according to this embodiment, the storage capacity of the storage device 220 is small. Accordingly, the storage device 220 may be unable to store both data input by the pupil and data acquired from the computer 100. Hence, in the information processing system 1 according to this embodiment, when the information apparatus 200 receives data from the computer 100, data input by the information apparatus 200 and stored in the storage device 220 may be saved to the storage 140 of the computer 100.

Figure 11:
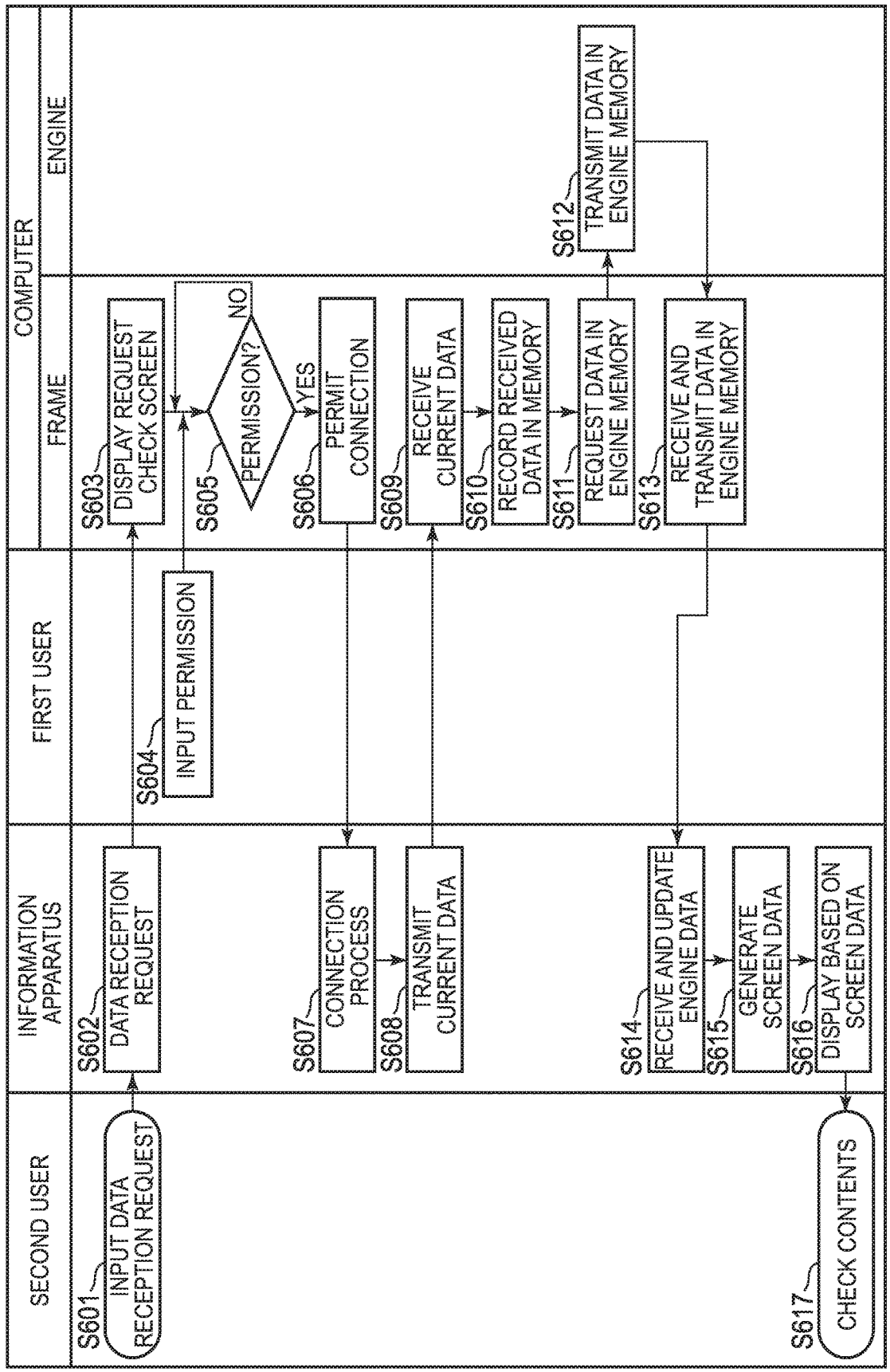
FIG. 11 is a flowchart schematically illustrating an example of the operation of the information processing system according to the embodiment.

The operation of the information processing system 1 according to this embodiment is described below. First, a process in which the information apparatus 200 requests data in the engine memory 491 from the computer 100 is described below, with reference to a flowchart illustrated in FIG. 11. The operator of the computer 100 who is a teacher as an example is referred to as a first user, and the operator of the information apparatus 200 who is a pupil as an example is referred to as a second user.

In step S601, the second user operates the input key 231 of the information apparatus 200, to input a request to receive the data stored in the computer 100. In step S602, having received the input, the information apparatus 200 communicates with the computer 100, and issues, to the emulator 400 of the computer 100, a data reception request for the data in the engine memory 491.

In step S603, having received the data reception request from the information apparatus 200, the frame 410 of the emulator 400 displays a request check screen indicating the reception of the data reception request and inquiring whether or not to permit data transmission. In step S604, having checked the request check screen, the first user inputs data transmission permission using the input device 150 of the computer, in the case of permitting data transmission.

In step S605, the frame 410 determines whether or not data transmission permission has been input. In the case where transmission permission has not been given, the frame 410 repeats the process in step S605 and waits for permission. For example, in the case where transmission permission has not been given for a predetermined period, the frame 410 may transmit a rejection of the data reception request to the information apparatus 200. In the case where transmission permission has been given, the process advances to step S606. Alternatively, transmission permission may be given in the case where a predetermined requirement, such as the emulator 400 having been started, is met, regardless of the operation of the first user.

The data reception request from the information apparatus 200 to the frame 410 may be accompanied with an ID unique to the information apparatus 200 or the ID in encrypted form. The frame 410 may perform connection, using the ID or the encrypted ID of the information apparatus 200 as an identification key. In the case where the frame 410 cannot properly decrypt the encrypted ID, the frame 410 may determine that the information apparatus 200 is not an authorized apparatus, and reject the data reception request regardless of the input of the first user.

For example, suppose a provider of the information apparatus 200 and the emulator 400 manages a private key. The private key of the information apparatus 200 is common, for example, for each destination of the information apparatus. The information apparatus 200 generates an identification key based on the ID and the private key, and transmits the ID and the generated identification key to the emulator 400. The emulator 400 decrypts the private key based on the received ID and identification key, and inquires of the provider managing the private key about private key information. The provider determines whether or not the inquired information is correct. In the case where the inquired information is correct, permission is given in step S605. In the case where the inquired information is not correct, permission is not given in step S605. For example, in the case where the information apparatus 200 is not an authorized product, the private key or the encryption method is not correct, so that the emulator 400 cannot decrypt the correct private key. Consequently, the provider determines that the information apparatus 200 is not an authorized product, and permission is not given in step S605.

In step S606, the frame 410 permits the connection of the information apparatus 200, and transmits the connection permission to the information apparatus 200. In step S607, having received the connection permission, the information apparatus 200 establishes connection with the emulator 400 of the computer 100.

In step S608, the information apparatus 200 transmits data stored in the storage device 220 of the information apparatus 200 to the emulator 400 as current data (first operation state information). The current data includes information of the operation mode of the calculator. The information of the operation mode includes, for example, information of which of standard calculation mode, statistic calculation mode, equation calculation mode, program mode, table calculation mode, and the like is the current operation mode. The current data includes input data which is information input to the information apparatus 200 by the second user. The input data includes a calculation formula, program code, etc. input by the user. The current data may include a computation result, a program execution result, etc. by the information apparatus 200. The current data may include all data stored in the storage device 220. The information apparatus 200 adds, to the current data, information of the ID assigned to the individual information apparatus 200.

The data transmission method may be low-power-consumption wireless communication such as Bluetooth or wired communication such as USB connection, depending on the method of connection between the information apparatus 200 and the computer 100. For example, data transfer may be performed in the following manner: Data to be transmitted is converted into an image of two-dimensional code such as QR Code®, and the computer captures the image of the code to read the code. A wireless LAN or the like is also applicable. The information apparatus 200 and the computer 100 may be connected via a network such as the Internet, instead of being connected directly to each other.

In step S609, the frame 410 receives the current data transmitted from the information apparatus 200. In step S610, the frame 410 records the received data of the information apparatus 200 in memory. The recording destination is, for example, an area related to the emulator 400 in the storage 140.

For example, suppose the plurality of information apparatuses 201, 202, and 203 simultaneously make a data reception request as illustrated in FIGS. 1 and 2. The computer 100 can record the respective data of the plurality of information apparatuses 201, 202, and 203 so as to be distinguishable from each other. These data may be managed using management data having the structure illustrated in FIG. 12 as an example. In the example illustrated in FIG. 12, data management is performed using management data associating a calculator ID indicating the ID of each information apparatus 200, a saved data name indicating the file name of the recorded data, and a date indicating the date and time of data reception and recording. In the case where data with the same ID is transmitted twice or more, for example, new data may be written over old data to record only the new data, or all different versions may be recorded.

In step S611, the frame 410 requests the data in the engine memory 491 from the engine 490. In step S612, the engine 490 transmits the data in the engine memory 491 to the frame 410. In step S613, the frame 410 receives the data in the engine memory 491 from the engine 490, and transmits it to the information apparatus 200 as engine data (second operation state information). The engine data has the same data structure as the current data, and includes the information of the operation mode of the calculator and the input data which is the information input to the computer 100 by the first user.

As described above, the operation state of the virtual electronic apparatus may be set based on the operation on the virtual information apparatus displayed on the liquid crystal display 161 or the screen 301, the first operation state information indicating the operation state of the actual machine 200 corresponding to the virtual information apparatus and connected to the computer 100 may be received from the actual machine 200, and, after receiving the first operation state information, the second operation state information indicating the set operation state may be transmitted to the connected actual machine 200.

In step S614, the information apparatus 200 receives the engine data transmitted from the frame 410. The information apparatus 200 writes the received engine data over the data in the storage device 220. As a result, the state of the information apparatus 200 becomes the same as the state of the engine 490 of the emulator 400. The term "same" used herein includes not only completely the same, but also substantially the same though partially different, the same in a main part, and the like. In step S615, the information apparatus 200 generates screen data based on the newly written data. In step S616, the information apparatus 200 displays a screen based on the screen data on the liquid crystal display 241. In step S617, the second user checks the screen displayed on the liquid crystal display 241 to check the contents.

As described above, the information apparatus 200 may: set the operation state of the information apparatus 200 to the state corresponding to the operation performed on the information apparatus 200; execute a first transmission process of transmitting first operation state information indicating the operation state of the information apparatus 200 to the external apparatus; after the first transmission process, execute a first reception process of receiving, from the computer 100, information of a second operation state indicating the operation state of the virtual information apparatus (the virtual information apparatus corresponds to the information apparatus 200 connected to the computer 100) that is set in response to the operation on the virtual information apparatus displayed on the liquid crystal display 161 or the screen 301 by the computer 100; and execute a first state setting process of setting the operation state of the information apparatus 200 to the second operation state that is the same as the operation state of the virtual information apparatus, based on the information of the second operation state received in the first reception process.

As described above, the information apparatus 200 receives the data in the engine memory 491 of the emulator 400 and writes the data over the information in the storage device 220, which brings the information apparatus 200 into the same state as the emulator 400. Consequently, for example, the pupil operating the information apparatus 200 can check, with the information apparatus 200 at hand, the data generated by the teacher operating the emulator 400.

Although the above describes an example in which the current data input by the pupil and recorded in the information apparatus 200 is simply recorded in the storage of the computer 100, this is not a limitation. For example, data acquired from the information apparatus 200 according to selection by the teacher may be written over the data in the emulator 400. Thus, the operation performed in the emulator 400 is not limited to input by the first user such as the teacher. For example, by taking data input by one pupil selected by the teacher into the engine memory 491 of the emulator 400, the data input by the one pupil can be operated in the emulator 400 and checked or shared by the whole classroom.

An example of the operation when the first user operates the emulator 400 in a state where the information apparatus 200 and the emulator 400 communicate with each other and the data in the information apparatus 200 is replaced with the data in the emulator 400 is described below, with reference to FIG. 13. In the example illustrated in FIG. 13, the operation of the emulator 400 is reflected in the information apparatus 200.

In step S701, the first user performs an input operation on the frame 410 of the emulator 400. In step S702, the frame 410 transfers an instruction corresponding to the input, to the engine 490. In step S703, the engine 490 executes a process corresponding to the instruction. In step S704, the engine 490 generates screen data corresponding to the state after the process, and transfers it to the frame 410. In step S705, the frame 410 displays a screen in the display area 441 of the frame 410, based on the received screen data. In step S706, the first user checks the operation result through the display of the frame.

In step S707, the frame 410 requests the data in the engine memory 491 from the engine 490. In step S708, the engine 490 transmits the data in the engine memory 491 to the frame 410, in response to the request. In step S709, the frame 410 receives the data in the engine memory 491, and transmits it to the information apparatus 200 as engine data.

In step S710, the information apparatus 200 receives the engine data from the computer 100, and updates the information recorded in the storage device 220 with the engine data. In step S711, the information apparatus 200 generates screen data based on the updated information. In step S712, the information apparatus 200 displays a screen based on the generated screen data on the liquid crystal display 241. In step S713, the second user checks the contents displayed on the liquid crystal display 241.

As described above, when the actual machine 200 corresponding to the virtual electronic apparatus is connected to the computer 100, the operation on the display area 441 of the calculator image frame 420 or the code display area 460 of the program display frame 450 may be received, and the display of the liquid crystal display 241 of the actual machine 200 connected to the computer 100 may be changed to the contents corresponding to the operation on the display area 441 of the calculator image frame 420 or the code display area 460 of the program display frame 450.

According to this embodiment, the second user such as the pupil can check the operation on the emulator 400 performed by the first user such as the teacher, with the information apparatus 200 at hand.

Although the above describes an example in which, each time the first user performs input to the emulator 400, all of the data in the engine memory 491 is transmitted to the information apparatus 200 and all of the data in the storage device 220 of the information apparatus 200 is overwritten, this is not a limitation. For example, the frame 410 may transmit, to the information apparatus 200, information of the input of the first user to the frame 410, and the information apparatus 200 that has received this information may update the state of the storage device 220 by treating the input information to the frame 410 as an input to the input device 230 of the information apparatus 200.

Although the above describes an example in which the operation of the emulator 400 is reflected in the information apparatus 200, the operation of the emulator 400 may not be reflected in the information apparatus 200. In other words, once the data in the emulator 400 has been acquired as described with reference to FIG. 11, the information apparatus 200 may operate in response to an operation by the second user.

For example, after checking the operation performed on the emulator 400 using the information apparatus 200, the second user may want to perform editing, operation, or the like again on the data input to the information apparatus 200. In such a case, in this embodiment, the information apparatus 200 requests the computer 100 to return the data saved to the computer 100. This operation is described below, with reference to a flowchart illustrated in FIG. 14.

In step S801, the second user operates the input key 231 of the information apparatus 200 to input a data return request. In step S802, the information apparatus 200 issues the data return request to the emulator 400 of the computer 100. The data return request is accompanied with the ID of the information apparatus 200.

In step S803, having received the data return request from the information apparatus 200, the frame 410 of the emulator 400 displays a request check screen indicating the reception of the data return request and inquiring whether or not to permit data return. In step S804, having checked the request check screen, the first user inputs data return permission using the input device 150 of the computer, in the case of permitting data return.

In step S805, the frame 410 determines whether or not data return permission has been input. In the case where return permission has not been given, the frame 410 repeats the process in step S805 and waits for permission. For example, in the case where return permission has not been given for a predetermined period, the frame 410 may transmit a rejection of the data return request to the information apparatus 200. In the case where return permission has been given, the process advances to step S806.

In step S806, the frame 410 transmits data (first operation state information) corresponding to the ID of the information apparatus 200 from among the data of the information apparatus 200 recorded in the storage 140, to the information apparatus 200. As mentioned above, after the transmission of the second operation state information, the frame 410 may transmit, in response to a request from the actual machine 200 that has received the second operation state information, the first operation state information received from the actual machine, to the actual machine 200.

As described above, the computer 100 may be connectable with one or more actual machines 200 each corresponding to a virtual information apparatus, the one or more actual machines 200 may each have unique ID information recorded therein. When first operation state information is received from each actual machine 200, the ID information unique to the actual machine 200 transmitting the first operation state information may be received, and the first operation state information and the ID information received from each actual machine 200 may be stored in association with each other. In the case of transmitting, in response to a request from one actual machine 200 from among the one or more actual machines 200, the first operation state information to the actual machine 200, the first operation state information associated with the unique ID information of the requesting actual machine 200 may be specified as the first operation state information to be transmitted from among the stored one or more sets of first operation state information, based on the unique ID information of the requesting actual machine 200.

In step S807, the information apparatus 200 receives the return data from the computer 100, and updates the information recorded in the storage device 220 with the data. In step S808, the information apparatus 200 generates screen data based on the updated information. In step S809, the information apparatus 200 displays a screen based on the generated screen data on the liquid crystal display 241. As a result, the state of the information apparatus 200 becomes the same as the state at the time of making the data reception request. Here, since data is managed according to IDs, the state is properly restored for each individual information apparatus 200. The term "same" used herein includes not only completely the same, but also substantially the same though partially different, the same in a main part, and the like. In step S810, the second user checks the contents displayed on the liquid crystal display 241.

As described above, after the first state setting process, a transmission request process of requesting the computer 100 to transmit the information of the first operation state transmitted to the computer 100 in the first transmission process may be executed; a second reception process of receiving the information of the first operation state transmitted from the computer 100 in response to the transmission request process may be executed; and a second state setting process of setting the operation state of the information apparatus 200 to the first operation state same as the operation state of the information apparatus 200 at a time of executing the first transmission process may be executed based on the information of the first operation state received in the second reception process.

Thus, the state of the information apparatus 200 is returned to the state before requesting the engine data in the emulator 400. According to this embodiment, for example, the second user such as the pupil can resume editing or the like again on the data input by the second user, after checking, with the information apparatus 200 at hand, the operation on the emulator 400 performed by the first user such as the teacher.

The computer 100 may hold the data of each information apparatus 200 in the storage 140, even after the return. For example, the data of the information apparatus 200 input by the pupil may be saved to the computer 100 operated by the teacher. Moreover, the data received from the information apparatus 200 may be edited in the emulator 400 before returning the data to the information apparatus 200, and the edited data may be returned to the information apparatus 200. For example, the teacher may operate the emulator 400 to correct the data generated by the pupil using the information apparatus 200, and return the corrected data to the information apparatus 200 of the pupil.

In situations where, for example, the method of data transfer from the information apparatus 200 to the emulator 400 is the above-mentioned method using two-dimensional code, it might be impossible to return data from the emulator 400 to the information apparatus 200.

The series of processes described above are exemplary, and may be each subjected to changes as appropriate. Processes other than the processes described above may also be included, and part of the processes described above may be omitted.

The present invention is not limited to the foregoing embodiments, and various modifications can be made upon implementation without departing from the scope of the present invention. Additionally, the embodiments may be combined as appropriate, and in this case, combined effects can be obtained. The foregoing embodiments incorporate various inventions, and various inventions can be extracted by combining selected ones of a plurality of constituent elements disclosed herein. For example, even when some of the constituent elements disclosed in the embodiments are omitted, an arrangement in which the constituent elements are omitted can be extracted as an invention as long as the problem can be solved and the effects can be achieved.

What is claimed is:

1. A non-volatile recording medium having recorded thereon a program for causing a computer of an information processing apparatus to:
    when displaying a virtual electronic apparatus on a first display, display a first display area and a second display area on the first display, each of the first display area and the second display area being capable of displaying at least a part of contents stored in a virtual memory of the virtual electronic apparatus as a display target of information to be displayed, the first display area being displayed on the first display as a virtual display of the virtual electronic apparatus, and the second display area being capable of simultaneously displaying, within one screen in the second display area, more contents than a maximum amount of contents simultaneously displayable within one screen in the first display area, from among the contents stored as the display target,
    wherein the second display area displays content that is also being displayed in the first display area, from among the contents stored as the display target, in a same way that the content is also being displayed in the first display area.

2. The recording medium according to claim 1, wherein the program further causes the computer of the information processing apparatus to:
    when displaying the virtual electronic apparatus on the first display, in the second display area of the first display, display simultaneously within one screen in the second display area more contents than the maximum amount of contents simultaneously displayable within one screen in the first display area while displaying at least the same contents as contents displayed on a second display included in an actual machine corresponding to the virtual electronic apparatus.

3. The recording medium according to claim 1, wherein the program further causes the computer of the information processing apparatus to:
when displaying the virtual electronic apparatus on the first display, display the first display area, which is capable of simultaneously displaying contents corresponding to a maximum of n rows from among the contents stored as the display target, and the second display area, which is capable of simultaneously displaying contents corresponding to more rows than the n rows from among the stored contents stored as the display target, on the first display.

4. The recording medium according to claim 1, wherein the program further causes the computer of the information processing apparatus to, when displaying first contents that are at least a part of the contents stored as the display target in the first display area:
in a case where the second display area is displayed on the first display, display second contents in the second display area, the second contents being at least a part of the contents stored as the display target and including at least the first contents; and
in a case where the second display area is not displayed on the first display, not display the second contents on the first display, and, in response to receiving an instruction to display the second display area on the first display, display the second display area on the first display and display the second contents in the second display area.

5. The recording medium according to claim 1, wherein the program further causes the computer of the information processing apparatus to:
in a case where the second display area is not displayed on the first display, in response to receiving an instruction to display the second display area on the first display, display the second display area on the first display and display second contents in the second display area, the second contents being at least a part of the contents stored as the display target and including at least first contents that are at least part of the contents stored as the display target.

6. The recording medium according to claim 1, wherein the program further causes the computer of the information processing apparatus to:
execute a program according to contents stored in the virtual memory of the virtual electronic apparatus; and
in a case where an error associated with the execution of the program occurs, display information notifying of occurrence of the error in the first display area and display program code of the program in the second display area so that a part at which the error occurs in the program code is visually distinguishable from other parts of the program code, on the first display.

7. The recording medium according to claim 1, wherein the program further causes the computer of the information processing apparatus to:
when displaying the contents stored as the display target in the second display area of the first display, make contents displayed in both the first display area and the second display area visually distinguishable from contents not displayed in the first display area but displayed in the second display area.

8. The recording medium according to claim 1, wherein the program further causes the computer of the information processing apparatus to:
in response to receiving a scroll operation on one of the first display area and the second display area, scroll display contents of the one of the first display area and the second display area and scroll display contents of the other of the first display area and the second display area.

9. The recording medium according to claim 1, wherein the program further causes the computer of the information processing apparatus to, when an actual machine corresponding to the virtual electronic apparatus is connected to the information processing apparatus:
receive an operation on the first display area or the second display area; and
in response to the operation on the first display area or the second display area, change a display of a second display of the actual machine connected to the information processing apparatus, to contents corresponding to the operation.

10. The recording medium according to claim 1, wherein the program further causes the computer of the information processing apparatus to:
set an operation state of the virtual electronic apparatus, based on an operation on the virtual electronic apparatus displayed on the first display;
receive first operation state information indicating an operation state of an actual machine corresponding to the virtual electronic apparatus and connected to the information processing apparatus, from the actual machine; and
after receiving the first operation state information, transmit second operation state information indicating the set operation state, to the connected actual machine.

11. The recording medium according to claim 10, wherein the program further causes the computer of the information processing apparatus to:
after transmitting the second operation state information, transmit, to the actual machine, the first operation state information received from the actual machine, in response to a request from the actual machine that has received the second operation state information.

12. The recording medium according to claim 11, wherein the information processing apparatus is connectable with one or more actual machines each corresponding to the virtual electronic apparatus,
wherein the one or more actual machines each have unique ID information recorded therein, and
wherein the program further causes the computer of the information processing apparatus to:
when receiving the first operation state information from each actual machine, receive ID information unique to the actual machine transmitting the first operation state information;
store the first operation state information and the ID information received from each actual machine in association with each other; and
when transmitting the first operation state information to one actual machine from among the one or more actual machines in response to a request from the one actual machine, specify one set of first operation state information associated with ID information unique to the one actual machine making the request from among stored one or more sets of first operation state information as the first operation state information to be transmitted, based on the ID information unique to the one actual machine making the request.

\* \* \* \* \*

UNITED STATES PATENT AND TRADEMARK OFFICE
CERTIFICATE OF CORRECTION

PATENT NO. : 11,061,560 B2  
APPLICATION NO. : 16/119540  
DATED : July 13, 2021  
INVENTOR(S) : Manato Ono It is certified that error appears in the above-identified patent and that said Letters Patent is hereby corrected as shown below:

In the Claims

Column 21, Line 18 (Claim 3, Line 11), before "contents" delete "stored".

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*